United States Patent [19]
Chastonay

[11] Patent Number: 5,629,475
[45] Date of Patent: *May 13, 1997

[54] METHOD OF RELOCATING THE CENTER OF PERCUSSION ON AN ASSEMBLED GOLF CLUB TO EITHER THE CENTER OF THE CLUB HEAD FACE OR SOME OTHER CLUB HEAD FACE LOCATION

[76] Inventor: Herman A. Chastonay, 6455 Potomac, St. Louis, Mo. 63139

[*] Notice: The term of this patent shall not extend beyond the expiration date of Pat. No. 5,277,051.

[21] Appl. No.: 457,411

[22] Filed: Jun. 1, 1995

[51] Int. Cl.$^6$ .................... A63B 53/00; G01M 1/38; G01N 1/12
[52] U.S. Cl. ........................... 73/65.03; 473/292
[58] Field of Search ............... 73/65.01, 65.03; 473/292

[56] References Cited

U.S. PATENT DOCUMENTS

| | | | |
|---|---|---|---|
| 1,351,768 | 9/1920 | Lawton | 73/65.03 |
| 2,062,673 | 12/1936 | Ogg et al. | 73/65.03 |
| 3,577,771 | 5/1971 | Solheim | 73/65.03 |
| 3,941,390 | 3/1976 | Hussey | 473/292 |
| 4,280,700 | 7/1981 | Plagenhoef | 473/292 |
| 4,832,344 | 5/1989 | Werner | 473/292 |
| 5,094,101 | 3/1992 | Chastonay | 73/65 |
| 5,176,383 | 1/1993 | Duclos | 273/167 |
| 5,180,166 | 1/1993 | Schmidt et al. | 273/167 |
| 5,193,805 | 3/1993 | Solheim | 273/77 |
| 5,205,552 | 4/1993 | Green, Jr. | 273/808 |
| 5,209,473 | 5/1993 | Fisher | 273/77 |
| 5,224,705 | 7/1993 | Scheie et al. | 273/77 |
| 5,272,802 | 12/1993 | Stites | 473/292 |
| 5,277,059 | 1/1994 | Chastonay | 73/65.03 |
| 5,318,296 | 6/1994 | Adams et al. | 273/77 |
| 5,328,184 | 7/1994 | Antonious | 473/292 |
| 5,390,919 | 2/1995 | Stubbs et al. | 473/292 |
| 5,417,108 | 5/1995 | Chastonay | 73/65.03 |
| 5,513,844 | 5/1996 | Ashcraft et al. | 73/65.03 |

OTHER PUBLICATIONS

Article entitled Center of Gravity by Ralph Maltby from *Golf Scene* dated Oct./Nov. 1991, pp. 16–17.

*Primary Examiner*—George M. Dombroske
*Attorney, Agent, or Firm*—Haverstock, Garrett & Roberts

[57] ABSTRACT

A method for relocating the center of percussion of an assembled golf club such that it substantially coincides with the center of the club head face, the present method taking into account the weight of the particular club shaft and grip affixed to the club head, the center of gravity of the club head both before and after the club shaft and grip are affixed thereto, and the offset relationship between the center of percussion of the assembled club and the center of the club head face. In its simplest form, the present method includes determining the center of percussion location on the club head face of the assembled club, comparing such location to the center of the club head face, and thereafter specifically weighing such club head so as to move the center of percussion of the assembled club from its previous offset position to substantially the center of the club head face. The present method is also advantageous in redesigning and manufacturing new club heads in that the resultant weight distribution pattern achieved for a particular club head establishes a new center of gravity location for such club head and this new weight distribution pattern and new center of gravity location can be replicated in a new club head design. Although the present method is centered around relocating the center of percussion of an assembled golf club to the center of the club head face, it is also ideally suited for relocating the center of percussion of an assembled golf club so as to either fall within an acceptable zone around the center of the club head face, or coincide with a location on the club head face where a golfer consistently makes contact with a golf ball.

8 Claims, 3 Drawing Sheets

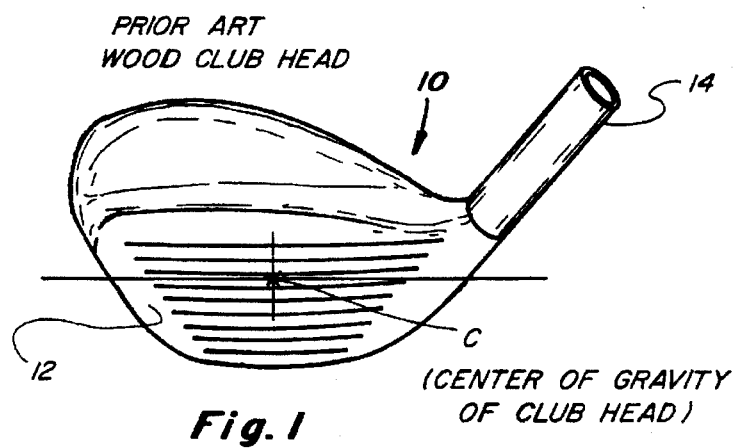
Fig. 1 PRIOR ART WOOD CLUB HEAD (CENTER OF GRAVITY OF CLUB HEAD)
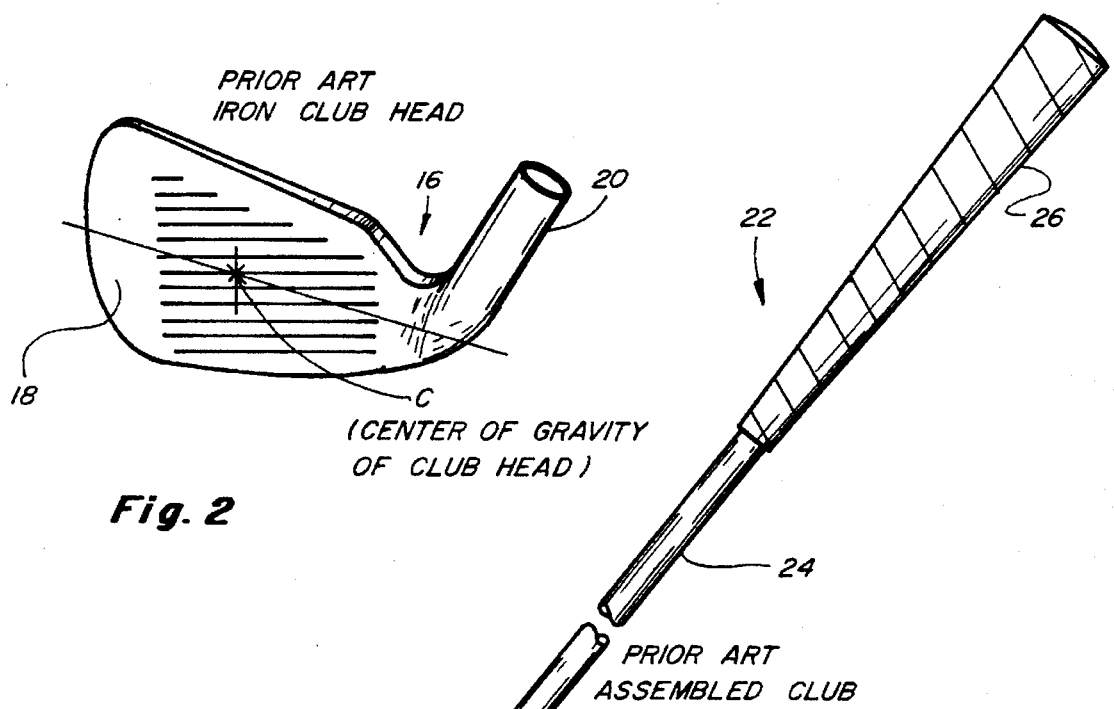
Fig. 2 PRIOR ART IRON CLUB HEAD (CENTER OF GRAVITY OF CLUB HEAD)
PRIOR ART ASSEMBLED CLUB
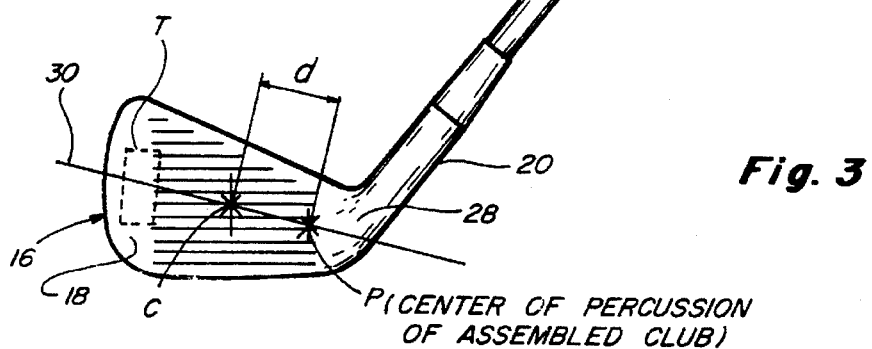
Fig. 3 P (CENTER OF PERCUSSION OF ASSEMBLED CLUB)

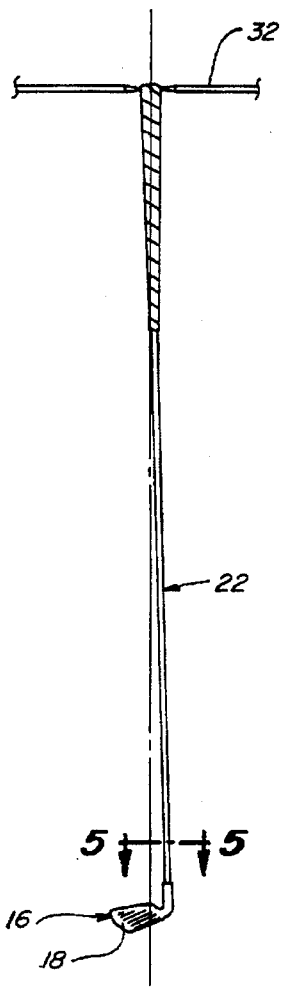
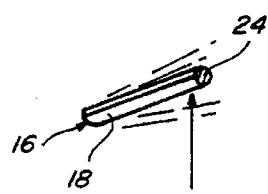
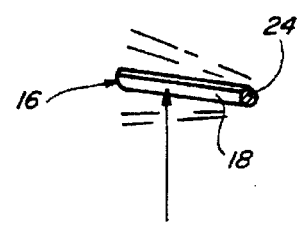
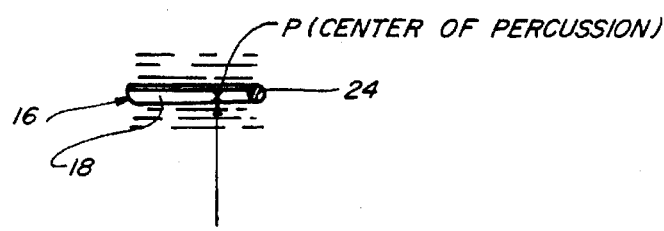
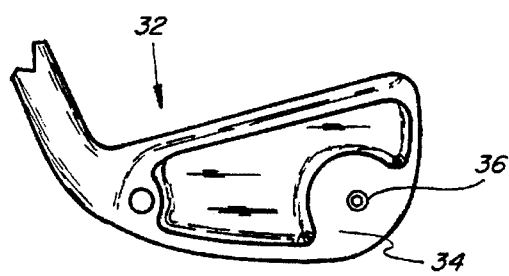
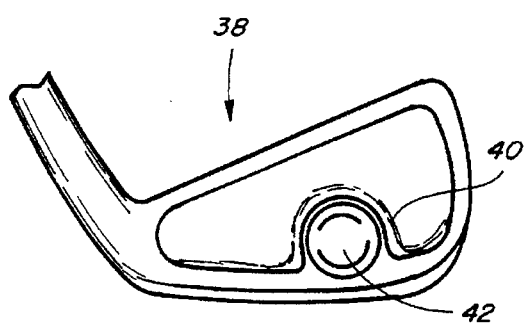
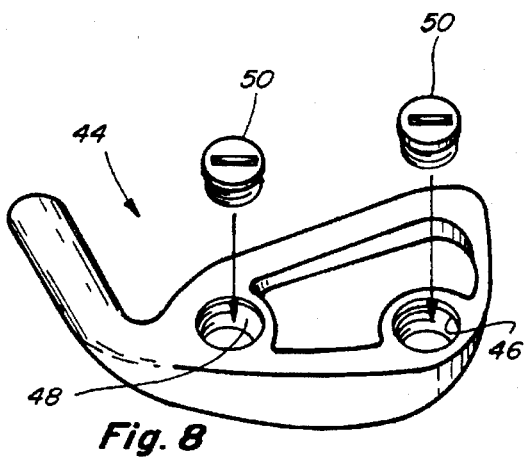

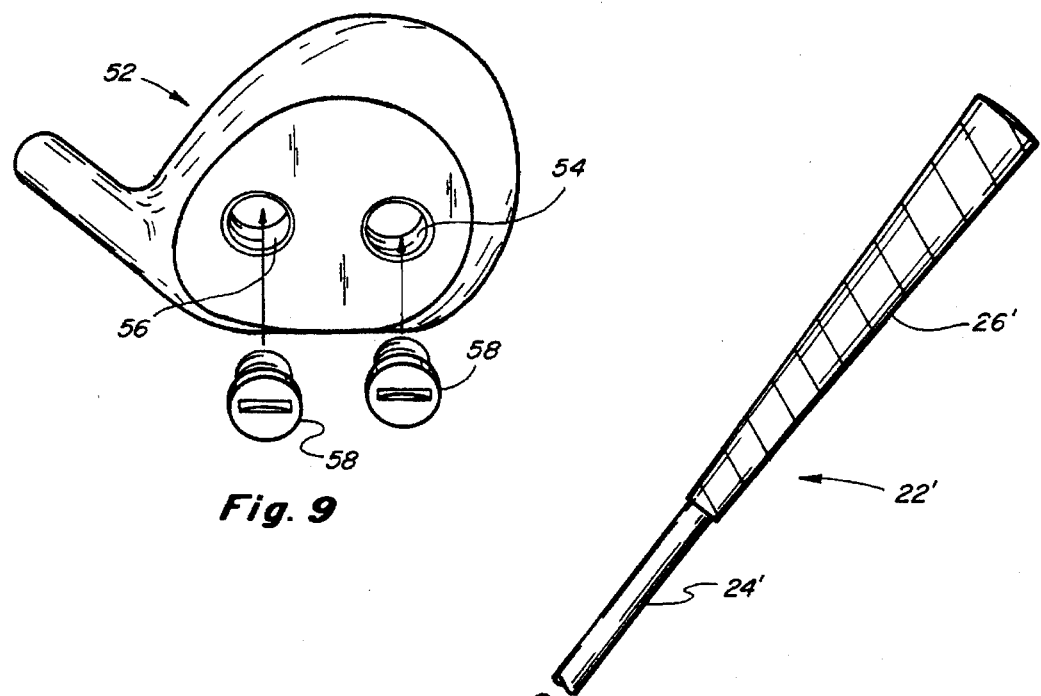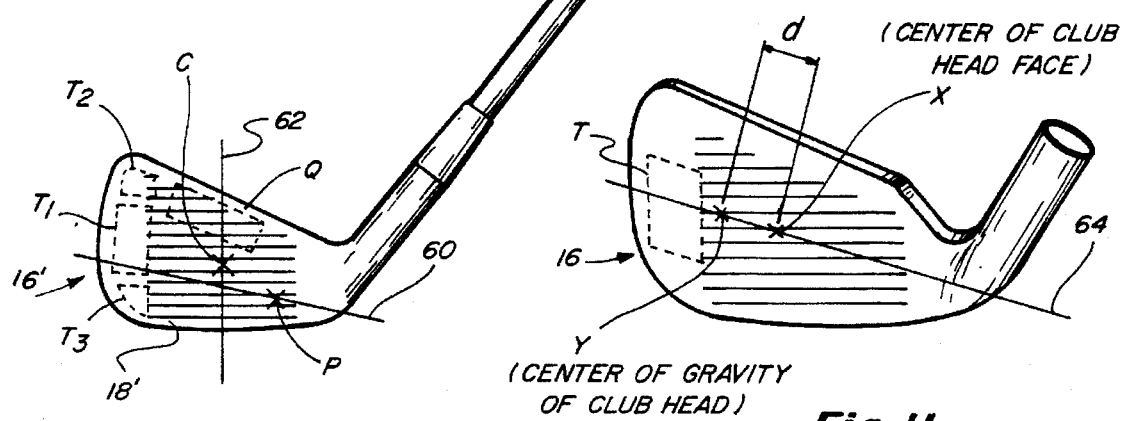

METHOD OF RELOCATING THE CENTER OF PERCUSSION ON AN ASSEMBLED GOLF CLUB TO EITHER THE CENTER OF THE CLUB HEAD FACE OR SOME OTHER CLUB HEAD FACE LOCATION

The present invention relates to a method for relocating the center of percussion of any particular golf club and, more particularly, to relocating the center of percussion location such that it coincides with the center of the club head face. The present method involves either a redistribution of the weight of a particular club head, or the adding of additional weight to such club head, such that the center of gravity of the club head itself, without the club shaft and grip affixed thereto, will be offset from the center of the club face towards the toe of the club head a sufficient or predetermined amount so as to locate the center of percussion of the assembled golf club (club head, shaft and grip) at the center of the club head face when the club shaft and grip are attached thereto. By co-locating the center of percussion of a particular golf club with the center of the associated club head face enables a golfer to transfer maximum energy to a golf ball, based upon the golfer's particular swinging motion, when the golf ball is struck at the center of the club head face. This re-alignment also greatly improves ball control and distance.

BACKGROUND OF THE INVENTION

Golf clubs are available featuring a wide variety of variations in design and construction, all of which se directed to achieve any number of desired results including improved performance and control. These variations include variations in the design, construction and weight of the club head, club shaft and club grip. Golf club heads are designed and manufactured separate and apart from the wide variety of different types of club shafts and club grips which are attached thereto to form assembled golf club. Golf club heads are typically designed so as to place the center of gravity of such club head at or near the center of the club face. In this regard, all wood club heads and some iron club heads are marked with appropriate markings such as a notch, line, V-shaped index type mark, circle or other mark to indicate the center of the club head face. Instructions, training and other golf aids typically remind the golfer to contact the ball at the center, or "sweet spot", of the club face. In golf terminology, the center of the club head face is supposed to be the center of percussion location. In actuality, this is not true as will be hereinafter explained.

It is commonly known that the optimal location on any club head for striking a golf ball corresponds to a location on the club head face, known as the center of percussion. The center of percussion is defined as that point located on the club face at which a body free to move as a compound pendulum about an axis of rotation can be struck so that the only motion imparted to the body will be a purely rotational motion around the body's axis of rotation. These concepts are more fully discussed and explained in Applicant's U.S. Pat. Nos. 5,094,101 and 5,277,059. Based upon the above assumption, striking a golf ball with a golf club using a compound pendulum motion at a location on the club head face corresponding to the center of percussion will impart a force to the golf ball which will be tangential to the arc of the pendulum motion of the club and which will direct the golf ball along a truer line corresponding to the intended direction of flight. This will also impart the best distance and direction/control characteristics to the ball since hitting the ball at the center of percussion location on the club face imparts no twisting or torsional motion to the ball. This results in maximum transfer of energy to the ball for a given golf swing. Striking a golf ball at club head face locations which do not correspond to the center of percussion location, even though using the same swinging motion, will cause a twisting or torsional motion to occur, which twisting or torsional motion will be imparted to the ball upon contact. This twisting motion will significantly affect the velocity, direction and effective force imparted to the ball and will produce widely varying results in ball distance, speed and direction.

When a particular club shaft and grip are affixed to a particular club head, the weight of the club shaft and grip shifts the center of gravity of the club head and, consequently, the center of percussion of the assembled golf club toward the heel of the club head. This shift in center of percussion away from the center of the club head face is not taken into account by the majority of golf club manufacturers and, as a result, the so-called "sweet spot" typically marked on a club head at the center of the club face, in actuality, does not coincide with the center of percussion location on such club face for the assembled golf club. This means that when a golfer makes contact with the ball at the center of the club head face, maximum transfer of energy is not imparted to the ball as explained above and, in total contrast to the desired goal, such contact will impart a twisting motion to the ball.

Because of this known misconception, professional golfers take the time to find the "sweet spot" or center of percussion associated with each individual golf club in their particular set of clubs since contacting the ball at the center of percussion location on each respective club head produces optimal results. Finding the center of percussion associated with each individual golf club can be achieved through trial and practice, or as explained hereinafter. Importantly, as discussed above, the actual location of the center of percussion for each individual golf club in a particular set of clubs does not coincide with the center of the respective club head faces and, in many instances, such centers of percussion are located at different locations for each respective club in a particular set. In a typical set of golf clubs, it has been observed that the center of percussion or "sweet spot" is actually located approximately $3/8$ inch or more towards the heel of the club head from the center of the club face. Club performance is tied directly to the location of the center of percussion on the club head face and if the center of percussion location is offset from the center of the club head face, it becomes increasingly more difficult for an average golfer to consistently strike a golf ball at the center of percussion location. Also, depending upon how far the center of percussion is actually offset from the center of the club head face, the mass concentration in such area of the club head may likewise be less desirable. It is therefore desirable to have the center of percussion of art assembled golf club lie substantially at the center of the club head face for all of the reasons discussed above.

SUMMARY OF THE INVENTION

The present invention teaches a method for relocating the center of percussion of a particular golf club to the center of the club head face so that when a golfer contacts a golf ball during a swinging motion at the center of the club head face, maximum energy is transferred to the ball for that particular swinging motion. Positioning the center of percussion at the center of the club head face once the club shaft and grip are affixed to the club head is accomplished by either redistribution and/or adding additional weight to the club head itself as will be hereinafter explained. In essence, the weight of the club head is distributed in such a manner that the center of gravity of the club head is moved off center towards the toe of the club head by a distance which, when a chosen club shaft and grip are affixed to the club head, the center of percussion will relocate to the center of the club head face. In this regard, weight can be added permanently to a particular club head at the appropriate location through any one of a variety of known means, or a new club head can be manufactured using the new weight distribution pattern determined for relocating the center of percussion in accordance with the present method. In either scenario, this relocation effort substantially increases the probability that, when a golfer makes contact with a golf ball at the center of the club head face, maximum energy, moment of inertia, and momentum will be transferred to the golf ball resulting in improved performance, longer ball distance and better control of ball direction.

As previously explained, since golf club heads are designed and constructed such that the center of gravity of the club head is located on a line which passes through the center of the club head face, when a particular club shaft and grip are attached to the club head, the weight of the shaft and grip pulls the center of percussion of the club away from the center of the club face towards the heel of the club head. This is due to the fact that all golf clubs have the club shaft affixed to the club head at some angular orientation relative to the heel portion of the club head. The present method can be utilized to relocate the center of percussion on a particular club head face both before and after a particular club shaft and grip are attached to a particular club head. In the situation where the club shaft and grip are already attached to the club head, the center of percussion of the assembled golf club can be determined using known weighting and measuring techniques such as those techniques explained in Applicant's U.S. Pat. Nos. 5,094,101 and 5,277,059. Once the center of percussion of the assembled club is located, its location is now compared to the center of the club head face. If these two locations do not coincide, then weight must be added to the club head in accordance with the present method so as to reposition the center of percussion to a location on the club head face which coincides with the center of such club face. The center of percussion location can be moved up and/or down on the club face both vertically and horizontally by adding weight to the club head as will be hereinafter explained. The exact amount of weight to be added to or redistributed in the club head as well as the position and location of such added or redistributed weight can be found through trial and error or by using known mechanics equations such as the equations for the center of percussion length and moment of inertia derived from the theory of dynamics of a rotating body set forth in Applicant's U.S. Pat. Nos. 5,094,101 and 5,277,059. This procedure will align the center of percussion of the assembled golf club with the center of the club head face to achieve maximum transfer of energy to the golf ball upon contact therewith as previously explained.

Where the particular club shaft and grip have not yet been attached to the club head, the first step, in this situation, is to determine how much weight needs to be added to or redistributed within the club head so as to offset the center of gravity of the club head towards the toe of the club head prior to attachment of a particular club shaft and grip thereto. The amount of offset towards the toe of the club head is predicated upon the weight of the particular shaft and grip attached thereto. Since a wide variety of different types of club shafts and grips are presently being manufactured including shafts made of both steel and graphite, the weight of the particular shaft and grip utilized does vary somewhat depending upon the particular type selected. If the particular club shaft and grip to be attached to a particular club head are known prior to such attachment, the exact weight of the shaft and grip can be determined. Using known techniques and the center of percussion equation derived from the theory of dynamics, the amount of shift of the center of percussion location from the center of the club head face towards the heel can be determined. Once this offset distance is determined, sufficient weight is added to the toe portion of the club head so as to move the center of gravity of the club head towards the toe of the club head a distance equal to the offset of the center of percussion location previously determined. Adding weight to or redistributing the weight of a particular club head towards the toe portion thereof will move the center of gravity of the club head laterally towards the toe of the club head. Sufficient weight is then added to the club head to move the center of gravity the offset distance previously calculated. This means that when the particular club shaft and grip are attached to the club head, the weight of both the shaft and grip will move the center of percussion location from the offset center of gravity location of the club head back towards the heel of the club head so as to end up at the center of the club head face.

In the interest of practicality, since many different types of club shafts and grips are available and since the respective weights associated with the available club shafts and grips likewise vary, a single club head can be manufactured so as to have its weight distributed so as to locate the center of gravity of the club head at a point where the use of any one of a plurality of heavier to lighter weight club shafts and grips in a specified group will fall within a range such that use of any one of the shafts and grips in such group will relocate the center of percussion of the assembled golf club substantially close to the center of the club head face. For example, use of any one of a plurality of club shafts and grips specified within a particular selected group or category with the particular club head weighted in accordance with the present method will relocate the center of percussion in a range spanning either side of the center of the club face. This range offset may, for example, extend towards the toe portion of the club head a distance of ¾ inch from the center of the club face and it may extend towards the heel portion of the club head a distance of ⅛ inch from the club face center. This will accommodate use of any one of the particular club shafts and grips falling within the specified weight group or category and still keep the center of percussion location within an acceptable distance from the center of the club head face.

Although the present method is centered around adjusting the center of percussion of an assembled golf club to the center of the club head face where a golfer will consistently attempt to strike a golf ball, it is also recognized that the present invention enables one to adjust the center of percussion of any assembled golf club to any other location on the club head face which corresponds to a particular point of contact preferred by that particular golfer for striking a golf ball during that golfer's particular golf swing. If a golfer has a preferred location on any golf club head face for striking the golf ball, all of the methods discussed above can be adapted so as to adjust the center of percussion of that particular golf club such that it corresponds to the preferred contact point on that particular club head face. This will accommodate any golfer who consistently contacts the golf ball at a particular spot on a particular club head face.

It is therefore a principal object of the present invention to provide a method for relocating the center of percussion location of a particular golf club such that it coincides with the center of the club head face.

Another object is to provide a method wherein the center of percussion of a particular golf club can be repositioned so as to correspond to a location on the club head face where a golfer consistently strikes the ball.

Another object is to teach a method for designing golf club heads wherein the center of gravity of such club head is offset towards the toe of the club head prior to attachment of a club shaft and grip thereto, and wherein the center of gravity of such club head is located substantially at the center of the club head face when a club shaft and grip are affixed thereto.

Another object is to teach a method for redistributing the weight of a golf club head towards the toe portion thereof such that when a particular club shaft and grip are affixed thereto, the center of percussion of the assembled golf club substantially coincides with the center of the club head face.

Another object is to teach a method for weighting golf club heads so as to substantially increase the probability that, when a golfer makes contact with a golf ball at the center of the club face, maximum energy will be transferred to the golf ball resulting in longer ball distance and better control of ball direction.

These and other objects and advantages of the present invention will become apparent to those skilled in the art after considering the following detailed specification in conjunction with the accompanying drawings.

BRIEF DESCRIPTION OF THE DRAWINGS

FIG. 1 is a front perspective view of a typical prior art wood club head construction;

FIG. 2 is a from perspective view of a typical prior art iron club head construction;

FIG. 3 is a front elevational view of a typical prior art assembled iron club construction showing the relationship between the center of percussion of the assembled club and the center of the club head face;

FIG. 4 is a front elevational view of a typical iron golf club such as the club illustrated in FIG. 3, the club being supported in a pivotal orientation for determining the location of its center of percussion;

FIGS. 5(a), 5(b) and 5(c) are each cross-sectional views taken along the line 5—5 of FIG. 4 illustrating movement of the club head when struck to the right of, to the left of, and at, respectively, the location on the club head face corresponding to the center of percussion of such club;

FIGS. 6 and 7 are each rear elevational views and FIG. 8 is a rear perspective view of typical iron club head constructions showing the use of various weight port arrangements for increasing the overall weight of a particular club head;

FIG. 9 is a bottom perspective view of a typical wood club head showing a weight port arrangement used in conjunction therewith;

FIG. 10 is a front elevational view of an assembled iron club construction similar to FIG. 3 illustrating both a horizontal as well as a vertical displacement between the center of percussion of the assembled club and the center of the club head face, the phantom lines indicating possible locations for adding weight to the club head;

FIG. 11 is a front perspective view of the iron club head illustrated in FIG. 2 showing the new center of gravity location of the club head determined in accordance with the present invention such that when a particular club shafts and grip are affixed thereto, the center of percussion of the assembled golf club will lie at the center of the club head face;

FIG. 12 is a front perspective view of the iron club head illustrated in FIG. 2 showing the new center of gravity location of the club head determined in accordance with the present invention such that when any one of a predetermined group of club shafts and grips are affixed thereto, the center of percussion of the assembled golf club will fall within a designated region sufficiently close to the center of the club head face; and FIG. 13 is a front perspective view of the iron club head illustrated in FIG. 2 illustrating the new center of gravity location of the club head determined in accordance with the present invention such that when a particular club shaft and grip are affixed thereto, the center of percussion of the assembled golf club will lie at a predetermined location on the club head face where a golfer consistently strikes a golf ball.

DETAILED DESCRIPTION OF THE INVENTION

Golf club heads are designed and manufactured separate and apart from the wide variety of different types of club shafts and club grips which are attached thereto to form an assembled golf club. Referring to the drawings more particularly by reference numbers wherein like numerals refer to like parts, number 10 in FIG. 1 identifies a typical wood club head and number 16 in FIG. 2 identifies a typical iron club head. The wood club head 10 includes a club face 12 and a shaft extension portion or hosel 14, the shaft extension 14 including a socket or cavity into which one end portion of a club shaft is inserted for attachment thereto. The iron club head 16 (FIG. 2) similarly includes a club face 18 and a shaft extension portion 20. As previously discussed, club heads such as the club heads 10 and 16 are typically designed such that the center of gravity of each such club head is located at or substantially near the center of the club face. This center of gravity, center of club head face, location is identified in FIGS. 1 and 2 as reference point C.

FIG. 3 represents a typical assembled golf club 22, which club 22 includes the iron club head 16 illustrated in FIG. 2. More particularly, the club 22 includes the club head 16, a typical club shaft 24 and a typical grip member 26. As also previously explained, when the club shaft 24 and grip 26 are affixed to the club head 16, the weight of the shaft and grip shifts or pulls the center of gravity C of the club head and, consequently, the center of percussion of the assembled club 22, away from the center C of the club face towards the heel of the club head. This new center of gravity location coincides with the center of percussion of the assembled club and is illustrated in FIG. 3 by the reference letter P. As can be ascertained from a review of FIG. 3, the center of percussion P of the assembled golf club 22 does not coincide with the center of the club head face C but, instead, is offset towards the heel or shank 28 of the club head 16 along the axis 30 by a distance "d". Also, importantly, since the center of percussion P of the assembled club 22 lies in the vicinity of the club shank portion 28, attempting to contact a golf ball at the true center of percussion of the golf club 22 increases the probability that a golfer will contact some portion of the golf ball with the shank 28 of the club head 16 thereby achieving the worst possible results with respect to ball distance, speed, direction and overall club control and performance. Although FIG. 3 illustrates the offset relationship between the center of percussion of a typical assembled iron golf club and the center of the iron club head face, this offset relationship is likewise true with respect to club heads made of wood such as the wood club head 10 illustrated in FIG. 1. For illustrative purposes only, most of the remaining discussion addressing the present invention will be directed towards relocating the center of percussion on an iron club head. The object of the present method is therefore to relocate the center of percussion P of the assembled club 22 (FIG. 3) such that it coincides with the center of the club face C by adding weight to the toe portion of the club head 16 to compensate for the weight of the shaft 24 and grip 26 when affixed to the club head 16.

Addressing first the situation where we already have an assembled golf club, the first step in the present method for relocating the center of percussion of an assembled club to the center of the club head face is to locate both the center of the club head face as well as the center of percussion of such assembled club. The center of the club head face can be easily located using known measuring techniques. Moreover, the center of percussion of an assembled golf club can be determined using known weighting and measuring techniques such as those techniques explained in Applicant's U.S. Pat. Nos. 5,094,101 and 5,277,059, or, the location of the center of percussion can be determined in the following manner. For example, referring to FIG. 4, the selected assembled golf club such as the club 22 (FIG. 3) is pivotally suspended about a horizontal axis 32 at the pivot point selected such as that point shown in FIG. 4. So suspended, the club face 18 of the club head 16 can be tapped or otherwise contacted so as to impart a pivotal motion about the horizontal axis of suspension 32. Tapping the club face 18 at different locations will produce different pivotal movements of the club head 16 such as illustrated in FIGS. 5(a), 5(b) and 5(c), such pivotal movements determining the center of percussion at the location lengthwise on the club face 18 as will be hereinafter explained. For example, FIG. 5(a) shows how the club head 16 would move when struck on the club face 18 to the right of the center of percussion; FIG. 5(b) shows how the club head 16 would move when struck to the left of the center of percussion; and FIG. 5(c) shows how the club head 16 would move when struck at the location on the club face 18 corresponding; to the center of percussion. It is important to note that striking the club face 18 either left or right of the center of percussion will also cause a twisting or torsion motion to occur. Only when the club face 18 is struck at the center of percussion location will the resulting movement be purely rotational or straightback about the horizontal axis 32 as shown in FIG. 5(c). When the club face 18 is struck such that the only motion imparted to the club head 16 is rotational or straightback motion about the axis 32, this location, identified as P in FIGS. 3 and 5(c), corresponds to the center of percussion for the selected club.

We are now ready to compare the center of percussion location of the selected club such as the golf club 22 illustrated in FIG. 3 with the center of the club head. Referring to FIG. 3, if the center of percussion location P does not coincide with the center of the club face C, we need to add weight to the club head 16 in accordance with the present method so as to reposition the center of percussion P to a location on the club face 18 which coincides with the center of such club face C. Determining the exact amount of weight to be added to the club head as well as the specific location or locations where such weight needs to be added to such club head can be determined either through trial and error, or by methods and techniques commonly used by club head manufacturers to initially co-locate the center of gravity of the club head with the center of the club head face. These methods and techniques are well known and some are disclosed in Applicant's U.S. Pat. No. 5,277,059.

When the center of percussion location and the center of the club head face are as illustrated in FIG. 3, the center of percussion can be moved along the axis 30 by adding weight to the toe portion of the club head 16 at locations such as at the location T shown in FIG. 3. Sufficient weight is then added so as to move the center of percussion from the location P illustrated in FIG. 3 to the center of the club head face location C.

Depending upon the particular type of club head being utilized, some club heads such as the iron club heads illustrated in FIGS. 6 and 7 include cavities, ports, or other means for increasing the overall weight of the particular club head. These weight cavities or ports are provided on many club heads so that a golfer can easily custom balance or swing weight his particular clubs any time during the life of such clubs. This also allows a golfer to easily change the balance of a particular club at any time, for any reason. For example, the club head 32 illustrated in FIG. 6 includes a raised cavity portion 34 located towards the lower toe portion of the club head on the back portion thereof, the cavity portion 34 being accessible by any plurality of known means such that weight can be added within the cavity to increase the overall weight of the club head. In the club head embodiment illustrated in FIG. 6, access to the cavity 34 is achieved through the set screw 36.

The club head 38 illustrated in FIG. 7 includes a weight cavity or port 40 which is positioned more towards the lower center portion of the back portion of the club head as illustrated. In this particular embodiment, a custom fit medallion 42 is provided and can be easily removed to provide access to the interior of the cavity 40. Once the medallion 42 is removed, any plurality of weighted discs can be inserted within the cavity 40 to add weight at that specific club head location. Still further, some club heads such as the club head 44 illustrated in FIG. 8 include dual weight cavities or ports such as the toe cavity 46 and the heel cavity 48. In this particular embodiment, access to the respective weight ports is achieved through the use of removable threaded fastener members such as the members 50. It is recognized that a particular club head may include any number of weight cavities or ports such as those illustrated in FIGS. 6–8 and it is also recognized and anticipated, as will be hereinafter further explained, that one or more of these weight ports or cavities can be specifically positioned and located on a particular club head so as to achieve the desired movement of the center of percussion location based upon use of any one of a plurality of known club shafts and grips. It is also recognized that other means and methods for adding weight to a particular club head in accordance with the present method can likewise be utilized.

Additional weight can also be easily added to wood club heads in the same fashion as discussed above with respect to iron club heads. Like the iron club heads illustrated in FIGS. 6–8, many wood club heads are also provided with one or more weight cavities or ports such as wood club head 52 illustrated in FIG. 9. Here again, club head 52 includes both a toe weight port or cavity 54 as well as a heel weight port or cavity 56 for custom balancing this particular club head when attached to a particular club shaft and grip. Access to the weight cavities 54 and 56 is likewise provided through the use of the threaded members 58. In those woods where weight ports are not provided, weight can easily be added by removing the sole plate and adding weight at the proper location underneath the sole plate. Also, weight ports or cavities can be added to the particular wood club head underneath the sole plate in a conventional manner. Like the iron club heads, other means for adding additional weight to a specific club head, at the proper location, is likewise recognized and anticipated.

If the center of percussion location is offset both vertically and horizontally from the center of the club head face as illustrated in FIG. 10, besides moving the center of percussion location P laterally along axis 60 by adding weight to the club head 16' at locations such as at the toe locations $T_1$, $T_2$, and/or $T_3$ shown in FIG. 10, it is also possible to move the center of percussion location vertically along axis 62 by adding weight towards the top portion of the club face such as at the location Q. In addition, as explained in Applicant's U.S. Pat. No. 5,277,059, the center of percussion location can likewise be moved vertically upwardly on any particular club head face by adding weight to the grip end of the assembled club. This, in effect, will decrease the center of percussion length "q" as explained in U.S. Pat. No. 5,277,059 thereby moving the center of percussion location upwardly towards the top of the club face. Regardless of which method or technique is utilized to determine the exact amount of weight to be added to the particular club head as well as the specific location at which to add such weight, once this procedure is accomplished in accordance with the present method, the center of percussion of the assembled golf club, such as the clubs 22 and 22' illustrated in FIGS. 3 and 10, will be aligned with the center of the club head face, such as the club faces 18 and 18', at the location C. Contacting a golf ball at the center C of the club head faces 18/18' will now ensure maximum transfer of energy to such ball resulting in an improved ball control, speed, direction, trajectory and distance.

Since weight has been added to the toe portion of the club heads 16/16', this addition of weight changes the dynamic balancing of the assembled golf clubs 22/22' using Applicant's radius of gyration balancing techniques as disclosed in Applicant's U.S. Pat. Nos. 5,094,101; 5,277,059; and 5,417,108. Since the radius of gyration or swing weight balancing of the clubs 22/22' is affected by any addition of weight to the club heads 16/16', once the center of percussion location P has been relocated so as to coincide with the center C of the club head faces 18/18', the entire club 22/22' can now be re-balanced in accordance with any one of Applicant's balancing methods disclosed in U.S. Pat. Nos. 5,094,101; 5,277,059; and 5,417,108. For example, weight can be added to the grip ends 26/26' of the clubs 22/22'. The amount and location of the weight added to the grip ends 26/26' can be adjusted so as to compensate for the weight added to the club heads 16/16' at locations T and/or Q so as to maintain the desired radius of gyration value as explained in U.S. Pat. Nos. 5,094,101 and 5,277,059, or so as to maintain a correlated swing weight designation as explained in U.S. Pat. No. 5,417,108. These double balancing techniques allow a golfer to re-locate the center of percussion of a particular golf club to the center of the club head face without changing the radius of gyration or swing weight balancing preferred by that particular golfer.

More particularly, although not required, the double balancing technique referred to above can be utilized to improve the overall handling characteristics of the club, once its center of percussion has been relocated in accordance with the present method, to better fit the optimal performance, control and comfortability characteristics of that particular golfer. As explained in Applicant's U.S. Pat. No. 5,417,108, all golfers seem to have at least one particular club within any given set of clubs which they feel more comfortable with in using and in which they can more accurately control when hitting any particular golf shot. This one preferred golf club is usually one of the shorter irons as they are easier to control during use because they are shorter when compared to the long irons and woods, especially the driver. Also, the longer clubs have larger center of gravity/radius of gyration lengths as compared to the shorter clubs, making them more difficult to use consistently with some degree of regularity. Double balancing brings the particular club back to its original radius of gyration or swing weight designation as now explained.

Since weight has been added to the club head in order to relocate the center of percussion of the assembled club, this addition of weight increases the swing weight designation of the assembled club as well as the center of gravity/radius of gyration lengths of such club. Adding the appropriate amount of weight to the grip end of the club as more fully explained in Applicant's U.S. Pat. No. 5,094,101 and 5,417,108 not only decreases the swing weight designation of the club and moves it back towards its original swing weight designation, but such additional weight also results in much lower center of gravity/radius of gyration lengths as compared to the original club. This means that the golfer will have the same feel characteristics as at the club's original swing weight designation but will have much less difficulty in actually swinging the club due to the reduced center of gravity/radius of gyration lengths achieved.

When the club head weight is increased, the swing weight designation and center of gravity of the club are also increased. In like fashion, when the swing weight of the affected club is restored or reduced to its original swing weight designation by adding weight at the grip end of the club, intuitively the center of gravity should also return to its original value. This is not the case. In fact, the center of gravity length of the club is much reduced from its original length. This can be demonstrated by reviewing the swing weight equation and the center of gravity equation set forth in U.S. Pat. No. 5,417,108, namely $$SW = W \times L \text{(swing weight equation)} \tag{1}$$

where:

SW=swing weight static moment;

W=total weight of club; and

L=distance between fulcrum or pivot point of swing weight scale device and the center of gravity of a particular golf club positioned thereon as best illustrated in FIG. 1 of U.S. Pat. No. 5,417,108.

$$r = L + P \text{(center of gravity equation)} \tag{1}$$

where:

r=distance between grip end portion of the club and the center of gravity (see FIG. 1 of U.S. Pat. No. 5,417,108);

L=distance between fulcrum or pivot point of swing weight scale device and the center of gravity of a particular golf club positioned thereon; and P=the fixed distance from the grip end portion of the club to the fulcrum or pivot point of the swing weight scale device as best illustrated in FIG. 1 of U.S. Pat. No. 5,417,108.

The swing weight designation and center of gravity location of an original club are mathematically represented as follows:

$$SW_O = W_O \times L_O \text{ and} \tag{3}$$

$$r_0 = L_0 + P_0 \text{(original assembled club before any weighting or balancing)} \quad (4)$$

Increasing the weight of the club head in accordance with the present method for relocating the center of percussion increases the total weight (W) of the assembled club by $\Delta W_H$ and this likewise increases the center of gravity length (r) and consequently the distance L in equation (2) above by $\Delta L_H$. This means that the swing weight designation and center of gravity location of the original club after it has been weighted in accordance with the present method (after the first balance) are represented as follows:

$$SW_H = (W_0 + \Delta W_H) \times (L_0 + \Delta L_H) \text{ and} \quad (5)$$

$$r_H = (L_0 + \Delta L_H) + P \text{(original assembled club after club head is weighted in accordance with the present method)} \quad (6)$$

Adding weight to the grip end of the club in order to restore the club to its original swing weight/radius of gyration value further increases the total weight of the club by $\Delta W_g$, but decreases the center of gravity length (r) and consequently the distance L in equation (2) above by $\Delta L_g$. The swing weight designation and center of gravity location of the original club after it has now been double balanced are represented as follows:

$$SW_0 = (W_0 + \Delta W_H + \Delta W_g) \times (L_0 + \Delta L_H - \Delta L_g) \text{ and} \quad (7)$$

$$r_f = (L_0 + \Delta L_H - \Delta L_g) + P \text{(final center of gravity length)} \quad (8)$$

Since the first term in equation (7) above, namely, $W_0 + \Delta W_H + \Delta W_g$, is greater than the original weight $W_0$ of the original club, and since the swing weight designation $SW_0$ in equation (7) after double balancing is equal to the original swing weight designation of the club as set forth in equation (3), then the second term in equation (7), namely, $(L_0 + \Delta L_H - \Delta L_g)$, must be less than the original length $L_0$ in equation (3). Since $(L_0 + \Delta L_H - \Delta L_g)$ is less than $L_0$, then the final center of gravity length $r_f$ in equation (8) is less than the original center of gravity length $r_0$ in equation (4). As a result, the center of gravity length $r_f$ is much reduced from its original length $r_0$ when the swing weight designation of the club is restored to its original designation via the double balancing method discussed above.

Double balancing therefore improves the performance of the club as well as the swing control experienced by the golfer by retaining the original swing weight designation of the club preferred by that particular golfer while reducing the center of gravity/radius of gyration lengths associated therewith. Although it is recognized that the final swing weight designation can be a slightly higher or lower swing weight designation as compared to the original swing weight designation, in all cases the final center of gravity/radius of gyration lengths will be shorter as compared to the original lengths. These shorter center of gravity/radius of gyration lengths further improve the overall feel, performance and control characteristics of that particular club and, in effect, allow more weight than normal to be added to a particular club head, hence a higher swing weight designation after the first balance as compared to known club head weighting techniques. This is true because the shorter center of gravity/radius of gyration lengths enable the club to swing easier even though heavier, since its swing weight designation can be more readily returned to its original designation. In fact, because the final center of gravity/radius of gyration lengths are shorter than the original lengths associated with such club, the final swing weight designation of such club, after double balancing, can actually be higher than the original designation. The below-listed table illustrates some typical swing weight scale designations which can be achieved using the double balancing technique described above, depending upon the particular skill level of the golfer involved.

| Golfer | Swing Weight Of Club After First Balance | Swing Weight Of Club After Second Balance |
| --- | --- | --- |
| VERY STRONG | Up to G-4 | D-4 to E-2 |
| STRONG | Up to F-8 | C-8 to D-7 |
| AVERAGE | Up to E-8 | B-8 to D-0 |

In fact, the more the swing weight designation is increased, the more the center of gravity length is reduced from its original length. However, in actuality, approximately two (2) ounces of weight added to a club head, or about a 32 swing weight point increase is about the maximum increase allowable before the $K^2/r$ ratio as explained in U.S. Pat. Nos. 5,227,059 and 5,417,108 is disturbed.

The present method of re-aligning the center of percussion of an assembled golf club so as to coincide with the center of the club head face is also advantageous for designing and manufacturing club heads. Where the particular club shaft and grip have not yet been attached to a particular club head, if the weight associated with a particular club shaft and grip, or if the weight associated with a plurality of commonly used club shafts and grips in a specified group are known, the particular club head can be designed such that the center of gravity of such club head is offset towards the toe portion of the club head prior to attachment of the selected club shaft and grip. In other words, the present method allows the club manufacturer to take into account the weight of both the club shaft and club grip and their effect on the center of percussion location of an assembled golf club during the designing and manufacturing stage of a particular club head.

In this particular situation, the first step is to determine how much weight must be added to or redistributed within the club head so as to offset the center of gravity of such club head towards its toe portion prior to attachment of a particular club shaft and grip thereto. As previously discussed with reference to FIGS. 1 and 2, the typical wood and iron club heads 10 and 16 illustrated in such figures are typically designed such that the center of gravity of each such club head is located at or substantially near the center of the club head face, namely, reference point C illustrated in FIGS. 1 and 2. This is the center of gravity location for each such club head prior to attachment of any club shaft and grip thereto. When a club shaft and grip are attached to a particular club head, such as the club heads 10 and 16 illustrated in FIGS. 1 and 2, the center of percussion of the assembled golf club shifts away from the center of the club face towards the heel of the club head as illustrated in FIG. 3. In order to compensate for this shift of the center of percussion as illustrated in FIG. 3, the center of gravity of the club head must be offset towards the toe of the club head a sufficient amount such that attachment of a particular club shaft and grip thereto will move the center of percussion back to the center of the club head face. With respect to the club head 16 illustrated in FIG. 3, this offset distance is equal to the distance "d" illustrated in FIG. 3. The amount of offset towards the toe of the club head is predicated upon the weight of the particular shaft and grip attached thereto. Since a wide variety of different types of club shafts and grips are available in the marketplace including shafts made of a wide variety of materials including steel and graphite, the weight of the particular shaft and grip utilized with a particular club head does vary somewhat depending upon the particular type selected. The re-configuration of a particular club head, or the designing of a new club head, can therefore take two different paths as explained hereinafter.

If the particular club shaft and grip to be attached to a particular club head are known prior to such attachment, the exact weight of the shaft and grip can be determined. Using known techniques as previously discussed with respect to FIG. 3, the amount of shift of the center of percussion location from the center of the club head face towards the heel of the club head can be determined. In this regard, the actual club shaft and grip can be attached to the selected club head and the center of percussion location car be found using any one of the techniques described in Applicant's U.S. Pat. Nos. 5,094,101 and 5,277,059, or the technique described above with respect to FIGS. 4 and 5. Once this offset distance is determined such as the distance "d" illustrated in FIG. 3, sufficient weight can then be added to the toe portion of the club so as to move the center of gravity of such club head towards the toe a distance equal to the offset distance "d" previously determined. Adding weight to the club head can be accomplished in many different ways as previously explained and discussed with respect to the club head constructions illustrated in FIGS. 6–10.

FIG. 11 illustrates the shifting of the center of gravity of a club head in accordance with the method just described. More particularly, the original center of gravity and center of the club head 16 illustrated in FIG. 11, without any club shaft and grip attached thereto, was located at reference point X. Adding weight to the club head 16 towards the toe portion thereof such as at the location T will move the center of gravity of the club head laterally along axis 64 towards the toe of the club head. Sufficient weight is then added to the club head such as at location T to move the original center of gravity X of the club head 16 the offset distance "d" previously calculated. This now locates the center of gravity of the club head 16 at the location Y. This means that when the particular club shaft and grip from which the offset distance "d" was previously determined are attached to the club head 16, the weight of both the shaft and grip will move the center of percussion location from the offset center of gravity location Y to the center of the club head face X. For the particular parameters discussed above with respect to the club head 16 illustrated in FIG. 11, and knowing that the center of gravity of such club head should be located at Y for the particular club shaft and grip selected, a new club head can be manufactured having its weight distributed so as to locate its center of gravity at the location Y illustrated in FIG. 11. In fact, specific club shafts and grips can be matched up with a set of specific club heads, both woods and irons, such that the particular club heads can be manufactured so as to have their respective weights distributed so as to locate the center of gravity of each respective club head at a predetermined offset location such as the location Y illustrated in FIG. 11. This means that when the respective club shafts and grips are attached to the respective club heads, the weight of the shafts and grips will move the center of percussion location of each respective club head, both woods and irons, from the offset center of gravity location of each respective club head to the center of each respective club head face.

However, in the interest of practicality, since many different types of club shafts and grips are available and since the respective weights associated with the available club shafts and grips vary widely, it is more advantageous to manufacture a single club head so as to have its weight distributed in such a fashion as to locate the center of gravity of the club head at a point such as at location Y in FIG. 12 where attachment of any one of a plurality of heavier to lighter weight club shafts and grips to such club head 66 will relocate the center of percussion of the assembled golf club substantially close to the center of the club head face. In this particular situation, a club head manufacturer can establish any particular grouping of club shafts and grips and, based upon using all of the various combinations of such club shafts and grips, an offset center of gravity location such as the location Y in FIG. 12 can be established such that when any combination of the selected shafts and grips are attached to the particular club head 66, the center of percussion of such assembled club head will fall substantially close to the center of the club head face X such as within the area Z illustrated in FIG. 12. This means that the particular club head 66 will be manufactured such that its center of gravity location is positioned at location Y. Thereafter, when any combination of the particular club shafts and grips are attached to the club head 66, the weight of the shaft and grip attached thereto will move the center of percussion location from the offset location Y back towards the center of the club head face X and such center of gravity location will fall somewhere within the region designated by the area Z. This will accommodate use of any one of the particular club shafts and grips included in the specific grouping and still keep the center of percussion location within an acceptable distance from the center of the club head face. It is recognized that, depending upon the particular combination of club shafts and grips so selected, the center of percussion location of the assembled club may fall between the center of the club head face and the toe portion thereof, or between the center of the club head face and the heel portion thereof. The establishment of the particular club shaft and club grip grouping upon which the offset center of gravity location Y in FIG. 12 is predicated can be based upon the typical types of club shafts and grips most commonly selected by an average golfer, or such grouping can be based upon very specific preferences of any one or any plurality of golfers.

In light of the above discussion with respect to FIG. 12, it is recognized that the center of percussion location of an assembled club can likewise be moved on the club head face by simply changing the type and weight of the particular club shaft and grip attached thereto. For example, if an assembled golf club such as the golf club 22 illustrated in FIG. 3 has its center of percussion location P as illustrated in FIG. 3 for the particular club shaft 24 and grip 26 attached thereto, it is possible to move the center of percussion location towards the center C of the club head face 18 by merely utilizing a lighter club shaft and grip combination. As the weight of the shaft and grip is reduced, the center of percussion P will move, towards the center of the club face 18. It is therefore possible to re-locate the center of percussion associated with any particular assembled golf club be merely changing the weight of the club shaft and club grip. Depending upon the amount of added weight necessary to relocate the center of percussion at the center of the club head face, adding weight to the toe portion of the club head may not be necessary. Instead, merely changing the club shaft and grip may provide the necessary reduction in weight to at least move the center of percussion of the assembled club within an acceptable distance from the center of the club head face such as within the region Z illustrated in FIG. 12. It is also anticipated that both a change in club shaft and grip as well as the addition of weight to a particular club head may be necessary in order to move the center of percussion of an assembled club to the center of the club head face, or at least within an acceptable distance from such center.

Although the present methods described above are centered around relocating the center of percussion of an assembled golf club to the center of the club head face where a golfer will consistently attempt to strike a golf ball, it is also recognized that the present methods enable one to adjust the center of percussion location of any assembled golf club to any other location on the club head face which corresponds to a particular point of contact preferred by that particular golfer for striking a golf ball based upon that golfer's particular golf swing. Based upon the particular style and swing techniques of a particular golfer, some golfers may consistently make contact with the golf ball during their particular swinging motion at a location other than the center of the club head face. If a golfer does, in fact, have a preferred location on any golf club head face for striking the golf ball during his/her particular swinging motion, all of the present methods discussed above can be adapted so as to adjust the center of percussion of that particular golf club such that it corresponds to the preferred contact point on that particular club head face. This preferred contact point location on a particular golf club head face can be determined through experimentation. Once this new golf ball contact point location is determined, such as the location N in FIG. 13, this location is compared with the center of percussion location for that particular golf club as previously explained. If the golfer's preferred point of contact with the golf ball on the particular club head face does not coincide with the center of percussion location, the center of percussion can be moved up or down on the club face as explained above with respect to FIGS. 3 and 10. In the case of an assembled golf club, the center of percussion of such assembled golf club is relocated to the location N on the club head face 68 illustrated in FIG. 13. Similarly, the club head 68 can likewise be designed and manufactured such that its center of gravity location lies at the location Y in FIG. 13 prior to attachment of a particular club shaft and grip thereto. As previously explained above with respect to FIGS. 10 and 11, the club head center of gravity location Y is determined such that when a particular club shaft and grip are attached to the club head 68, the center of percussion of the assembled golf club will shift from the location Y to the location N as illustrated in FIG. 13. These procedures will accommodate any golfer who consistently contacts the golf ball at a particular spot on a particular club head face such as at the location N illustrated in FIG. 13.

Thus, there has been shown and described several novel methods for relocating the center of percussion of an assembled golf club to either the center of the club head face, or some other club head face location, which methods fulfill all of the objects and advantages sought therefor. Many changes, modifications, variations, and other uses and applications of the present methods will, however, become apparent to those skilled in the art after considering this specification and the accompanying drawings. All such changes, modifications, variations, and other uses and applications which do not depart from the spirit and scope of the present invention are deemed to be covered by the invention which is limited only by the claims which follow.

What is claimed is:

1. A method for relocating the center of percussion of an assembled golf club to a location on the club head face where a golfer consistently makes contact with a golf ball, said assembled golf club including a club head, a club shaft and a grip, said method comprising the following steps:

(a) determining the center of percussion location on the club head face of the assembled club;

(b) determining where on the club head face a golfer consistently makes contact with a golf ball during that golfer's swinging motion;

(c) comparing the center of percussion location determined in step (a) above with the location on the club head face determined in step (b) above;

(d) determining the swing weight scale designation for said assembled golf club;

(e) determining the center of gravity length of said assembled golf club;

(f) weighting the club head so as to move the center of percussion location of the assembled club from the location determined in step (a) above to the location on the club head face determined in step (b) above; and (g) adding weight to the grip end of said assembled golf club so as to return said assembled club to substantially the same swing weight scale designation determined in step (d) above without changing the center of percussion location obtained in step (f) above while at the same time reducing the center of gravity length of said assembled club determined in step (e) above.

2. The method in accordance with claim 1 further comprising the following steps:

(h) determining an acceptable zone around the location on the club head face determined in step (b) above within which the center of percussion of the assembled club may lie when a particular club shaft and grip are attached to said club head;

(i) selecting a plurality of additional club shafts and grips to be used in conjunction with said club head, said additional plurality of club shafts and grips varying in weight as compared to the club shaft and grip associated with said assembled golf club, said plurality of additional club shafts and grips being selected on the basis that when any one of said plurality of additional club shafts and grips are attached to said club head, the center of percussion of such assembled club will lie within the acceptable zone determined in step (h) above."

3. A method of weighting a club head such that when a club shaft and grip are affixed thereto, the center of percussion of the assembled club will be located at the center of the club head face, said method comprising the following steps:

(a) selecting a particular club head having a predetermined center of gravity location and a predetermined center of the club head face;

(b) selecting a club shaft and grip to be affixed to said club head;

(c) affixing the club shaft and grip selected in step (b) above to the club head selected in step (a) above;

(d) determining the center of the percussion location of the club assembled in step (c) above;

(e) comparing the center of percussion location determined in step (d) above with the center of the club head face;

(f) determining the offset relationship between the center of percussion location determined in step (d) above and the center of the club head face;

(g) disassembling the club shaft and grip from the selected club head;

(h) determining a new center of gravity location for the selected club head based upon the offset relationship determined in step (f) above such that when the selected club shaft and grip are again affixed to the selected club head., the center of percussion of the assembled club will be located substantially at the center of the club head face; and (i) weighting the selected club head so as to achieve the center of gravity location determined in step (h) above.

4. The method in accordance with claim 3 further comprising the designing of a new club head based upon the weighting arrangement determined in step (i) above, said new club head having a weight distribution pattern which will locate the center of gravity of such club head at the location determined in step (h) above.

5. A method of weighting a club head such that when a club shaft and grip are attached thereto, the center of percussion of the assembled club will be located at the center of the club head face, said method comprising the following steps:

(a) selecting a particular club head to be weighted;

(b) determining the center of the club head face;

(c) selecting a club shaft and grip to be attached to said club head;

(d) determining the center of percussion location on the club head face of the assembled club based upon attaching the club shaft and grip selected in step (c) above to the club head selected in step (a) above;

(e) comparing the center of percussion location determined in step (d) above with the center of the club head face determined in step (b) above;

(f) determining the offset relationship between the center of percussion location determined in step (d) above and the center of the club head face;

(g) determining a new center of gravity location for the selected club head based upon the offset relationship determined in step (f) above such that when the selected club shaft and grip are affixed to the selected club head, the center of percussion of the assembled club will be located substantially at the center of the club head face; and (h) weighting the selected club head so as to achieve the center of gravity location determined in step (g) above.

6. The method in accordance with claim 5 further comprising the following steps:

(i) determining an acceptable zone around the center of the club head face within which the center of percussion of the assembled club may lie when a particular club shaft and grip are attached to said club head;

(j) selecting a plurality of additional club shafts and grips to be used in conjunction with said club head, said additional plurality of club shafts and grips varying in weight as compared to the previously selected club shaft and grip, said plurality of additional club shafts and grips being selected on the basis that when any one of such plurality of additional club shafts and grips are attached to said club head, the center of percussion of such assembled club will lie within the acceptable zone surrounding the center of the club head face determined in step (i) above.

7. A golf club comprising a club head and any one of a plurality of club shafts and grips selected for use in conjunction with said club head, said club head being weighted so as to have its center of gravity positioned and located in spaced relationship to the center of the club head face such that when any one of said selected plurality of club shafts and grips are affixed to said club head, the center of percussion of the assembled club will lie within a predetermined defined area surrounding the center of the club head face, said predetermined defined area being established based upon the weight associated with the respective club shafts and grips forming said selected plurality and based upon an acceptable range of offset distances from the center of the club head face.

8. A method of weighting a club head such that when a club shaft and grip are affixed thereto, the center of percussion of the assembled club will lie at a location on the club head face where a golfer consistently makes contact with a golf ball during that golfer's swinging motion, said method comprising the following steps:

(a) selecting a particular club head to be weighted;

(b) determining the center of the club head face;

(c) determining where on the club head face a golfer consistently makes contact with a golf ball during that golfer's swinging motion;

(d) selecting a club shaft and grip to be affixed to said club head;

(e) determining the center of percussion location on the club head face of the assembled club when the selected club shaft and grip are affixed to said club head;

(f) comparing the center of percussion location determined in step (e) above with the location on the club head face determined in step (c) above;

(g) determining the offset relationship between the center of percussion location determined in step (e) above and the location determined in step (c) above;

(h) determining a new center of gravity location for the selected club head based upon the offset relationship determined in step (g) above such that when the selected club shaft and grip are affixed thereto, the center of percussion of the assembled club will be located at the location determined in step (c) above; and (i) weighting the club head so as to achieve the center of gravity location determined in step (h) above.

* * * * *

UNITED STATES PATENT AND TRADEMARK OFFICE
CERTIFICATE OF CORRECTION

PATENT NO.   :   5,629,475
DATED        :   May 13, 1997
INVENTOR(S)  :   Herman A. Chastonay Page 1 of 2

It is certified that error appears in the above-indentified patent and that said Letters Patent is hereby corrected as shown below:

On the cover page: Item [*]   "Pat. No. 5,277,051"
should be --Pat. No. 5,277,059--.

Column 1, line 30, "se" should be --are--.

Column 1, line 51, delete the "," after "face".

Column 2, line 54, "art" should be --an--.

Column 5, line 35, "from" should be --front--.

UNITED STATES PATENT AND TRADEMARK OFFICE
CERTIFICATE OF CORRECTION

PATENT NO. : 5,629,475
DATED : May 13, 1997
INVENTOR(S) : Herman A. Chastonay

It is certified that error appears in the above-indentified patent and that said Letters Patent is hereby corrected as shown below:

Column 6, line 1, "shafts" should be --shaft--.

Column 10, line 18, "No." should be --Nos.--.

Column 10, line 50, "(1)" should be --(2)--.

Column 16, line 36, delete " after "above".

Column 16, line 63, delete "." after "head" and before ",".

Signed and Sealed this

Eleventh Day of November, 1997

Attest:

BRUCE LEHMAN

Attesting Officer

Commissioner of Patents and Trademarks